Sept. 5, 1961         C. F. KOSMERL         2,998,833
CORN COB HANDLE FORMING DEVICE
Filed March 30, 1959
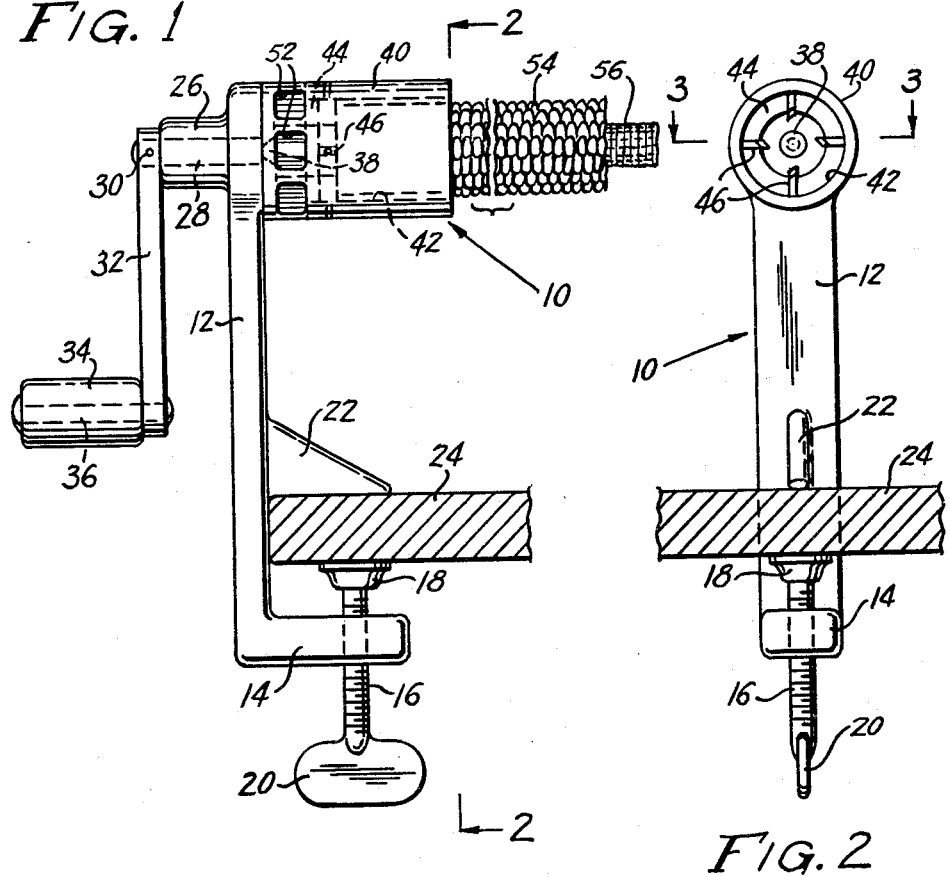
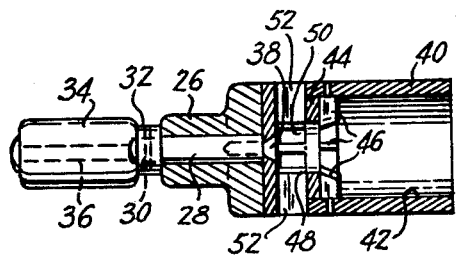
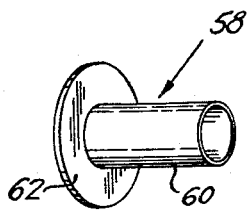
INVENTOR.
CHARLES F. KOSMERL
BY
Gustave Miller
ATTORNEY

2,998,833
CORN COB HANDLE FORMING DEVICE
Charles F. Kosmerl, Shawnee on Delaware, Pa.
(Minisink Hills, Monroe County, Pa.)
Filed Mar. 30, 1959, Ser. No. 802,702
1 Claim. (Cl. 146—4)

This invention relates to the processing of ears of corn, or corn-on-the-cob, as it is called, and it particularly relates to forming handles on the ears of corn for easy grasping and manipulation while eating.

It is well known that despite the succulence of corn-on-the cob, many persons do not choose to eat it because of the messiness and general difficulty of handling it while eating; this is especially true where the corn has been smeared with butter or the like.

It is one object of the present invention to overcome the above difficulties by providing a device adapted to simply and easily form handle portions directly on the ears of corn; such handles eliminating any necessity for holding the edible portion of the corn while eating.

Another object of the present invention is to eliminate any mess or discomfort incident to the eating of corn-on-the-cob even when the corn is buttered.

Another object of the present invention is to provide a simple yet effective device for forming the aforesaid handles on the corn cob.

Other objects of the present invention are to provide an improved handle-forming device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

FIG. 1 is a side elevational view of a device embodying the present invention, the device being illustrated in the process of working on an ear of corn.

FIG. 2 is a sectional view taken on line 2—2 of FIG. 1.

FIG. 3 is a sectional view taken on line 3—3 of FIG. 2.

FIG. 4 is a perspective view of an attachment adapted to be applied to an ear of corn after being processed in accordance with the present invention.

Referring in greater detail to the drawing wherein similar reference characters refer to similar parts, there is shown a device, generally designated 10, comprising a bracket 12 having a lateral extension 14 at its lower end. The extension 14 is provided with a threaded aperture through which extends a clamping screw 16 having a clamping head 18 at its upper end and a handle 20 at its lower end. Spaced from the extension 14 longitudinally of bracket 12 is a rigid clamping finger 22. The clamping head 18 and clamping finger 22 are adapted to releasably clamp the bracket 12 to a table or other support indicated at 24.

At the upper end of bracket 12 is provided a bearing 26 supporting a rotatable shaft 28. The shaft 28 extends exteriorly of the bearing 26 and is pinned, as at 30, to an operating crank handle lever 32. The crank handle lever 32 is provided at its lower end with a laterally-extending crank handle 34 mounted on a spindle 36.

At the opposite side of bearing 26, relative to crank handle 32, the shaft 28 has connected thereto by screw 38, the rear of a sleeve 40. The sleeve 40 is hollow to form a cylindrical pocket 42. At the rear of this pocket 42 is provided a ring 44 to which is affixed a plurality of knives or blades 46, here shown as four in number. The blades 46 are equi-distantly and circumferentially spaced from each other around the supporting ring 44 and are set in the ring 44 with their cutting edges at about a 60° angle relative to the face of the ring 44.

Closely positioned behind the blades 46 and extending into the central aperture of ring 44 is a drum 48 having circumferentially-spaced slots 50 therein. These slots 50 are adapted to mate with slots 52 in the sleeve 40. Obviously, although sleeve 40, drum 48 and ring 44 are shown as three separate parts, when assembled they are a unitary device, and are swaged or fitted to act as a unitary device, and hence could be initially formed as a single unit, and could even be molded or cast as a single metal or plastic unit. Thus, in effect, sleeve 40 is counterbored with a shoulder formed by ring 44, with aligned apertures 50 and 52 extending radially from the small counterbore, and the rear end is closed except for the axial aperture through which the fastening screw 38 is secured into the crank handle shaft 28.

In operation, with the device clamped in position as in FIG. 1, an ear of corn 54 is inserted at one end into the pocket 42 of the drum 40 and is pressed thereinto while the crank handle lever 32 is turned. This rotates the shaft 28 which rotates the sleeve 42 and the blades 46 held therein. The blades 46, as they rotate, shear through the outer peripheral portion of the end of the corn cob held thereagainst to form a cylindrical cut. The sheared end of the cob is then forced, by the constant pressure at its other end, into the cylindrical drum 48 which forms it into a definitely cylindrical rod portion suitable for grasping. Such rod portion is indicated at 56 in FIG. 1. The residue of the cutting operation falls automatically out of the slots 52 after passing through slots 50. When one end of the cob has been processed in the aforesaid manner, the cob is reversed and the opposite end is inserted into the pocket 42 and processed (as indicated in FIG. 1).

After the corn cob has been completely processed in the above-described manner, it is preferably provided at each end with a holder unit 58 (see FIG. 4). Each unit 58 comprises a hollow, cylindrical stem 60 having a circular flange 62 at one end thereof. The stem 60 and flange 62 may be made integral or separate. Preferably, the stem 60 is made of fine corrugated paper and the flange 62 comprises a centrally apertured disc made of good quality cardboard, but of course, could be of suitable plastic. However, the holder unit 58 may be constructed of various other types of material such as molded paper pulp, natural or synthetic resin, aluminum foil, etc.

Of whatever construction the holder units 58 are made, their use is obvious; such use consisting of slipping a holder 58 over the rod portion 56 at each end of the cob 54 with the flange portion 62 abutting the uncut end of the cob. This use of holder units 58 make the eating of the corn a sanitary and mess-free process whereby the stem 60 forms a greaseless, convenient handle while the flange 62 prevents access of drippings or particles onto the eater.

Although this invention has been described in considerable detail, such description is intended as being illustrative rather than limiting, since the invention may be varously embodied, and the scope of the invention is to be determined as claimed.

Having thus set forth and disclosed the nature of this invention, what is claimed is:

A handle forming device for corn cobs, said device comprising a supporting bracket, a shaft journaled in said bracket, means for rotating said shaft, a hollow cylindrical sleeve open at its front end, a rear wall closing the opposite end of said sleeve and connected to said shaft, an annular drum mounted in said sleeve against said rear wall, said drum and said sleeve having a plurality of mating radially extending debris-discharging apertures, a knife supporting ring mounted in said sleeve against said annular drum, and a plurality of radially extending knives supported in said ring, whereby when the end of a corn cob is held within said sleeve and pressed against said knives as said shaft rotating means is operated, said knives will cut an annular recess into said end of said corn cob and form a cylindrical handle thereon.

References Cited in the file of this patent

UNITED STATES PATENTS

| | | |
|---|---|---|
| 179,193 | Herring | June 27, 1876 |
| 788,474 | Keller | Apr. 25, 1905 |
| 1,277,148 | Starr | Aug. 27, 1918 |
| 1,633,365 | Ebmeier | June 21, 1927 |
| 2,147,548 | Rife | Feb. 14, 1939 |
| 2,318,713 | Preble | May 11, 1943 |
| 2,493,588 | Martin | Jan. 3, 1950 |
| 2,503,801 | Clarke | Apr. 11, 1950 |
| 2,609,852 | Houldsworth | Sept. 9, 1952 |